(12) United States Patent
Huang

(10) Patent No.: US 12,123,375 B2
(45) Date of Patent: Oct. 22, 2024

(54) APPARATUSES AND METHODS FOR FUEL INJECTION AND IGNITION IN AN INTERNAL COMBUSTION ENGINE

(71) Applicant: HPDI TECHNOLOGY LIMITED PARTNERSHIP, Vancouver (CA)

(72) Inventor: Jian Huang, Surrey (CA)

(73) Assignee: HPDI Technology Limited Partnership, Vancouver (CA)

( * ) Notice: Subject to any disclaimer, the term of this patent is extended or adjusted under 35 U.S.C. 154(b) by 0 days.

(21) Appl. No.: 18/565,909

(22) PCT Filed: Jun. 2, 2022

(86) PCT No.: PCT/CA2022/050885
§ 371 (c)(1),
(2) Date: Nov. 30, 2023

(87) PCT Pub. No.: WO2022/251965
PCT Pub. Date: Dec. 8, 2022

(65) Prior Publication Data
US 2024/0254949 A1 Aug. 1, 2024

Related U.S. Application Data

(60) Provisional application No. 63/196,205, filed on Jun. 2, 2021.

(51) Int. Cl.
*F02M 21/02* (2006.01)
*F02M 57/06* (2006.01)

(52) U.S. Cl.
CPC ........ *F02M 21/0275* (2013.01); *F02M 57/06* (2013.01)

(58) Field of Classification Search
CPC ........................... F02M 21/0275; F02M 57/06
See application file for complete search history.

(56) References Cited

U.S. PATENT DOCUMENTS

| 4,892,070 A | 1/1990 | Kuhnert |
| 6,854,438 B2 | 2/2005 | Hilger et al. |

(Continued)

FOREIGN PATENT DOCUMENTS

| JP | H02101029 U | 8/1990 |
| JP | H02132814 U | 11/1990 |
| JP | H0323667 A | 1/1991 |

OTHER PUBLICATIONS

International Search Report and Written Opinion of the International Searching Authority, mailed Sep. 12, 2022, for International Application No. PCT/CA2022/050884, 11 pages.

(Continued)

*Primary Examiner* — Jacob M Amick
*Assistant Examiner* — Charles J Brauch
(74) *Attorney, Agent, or Firm* — Seed IP Law Group LLP

(57) ABSTRACT

An improved apparatus for injecting and igniting fuel in an internal combustion engine includes a nozzle with a bore and a tip at a distal end. The bore includes a longitudinal axis and an annular valve seat. A needle reciprocates within the bore and in combination with the annular valve seat forms an injection valve where in a closed position the needle abuts the annular valve seat and in an open position the needle is spaced apart from the annular valve seat. A retainer axially protrudes from the tip of the nozzle along the longitudinal axis thereof whereby an annular mixing space extends between the retainer and the tip of the nozzle. There is an igniter secured to the nozzle that includes a positive-ignition source forming an ignition zone within a portion of the annular mixing space. Nozzle arrangements include those with both pilot hole and main holes in the nozzle extending between the plenum and outside the nozzle where the main hole longitudinal axis bypasses the retainer and a pilot fuel jet from the pilot hole(s) is retained and redirected such that an ignitable fuel-air mixture is formed within the annular (Continued)

mixing space. Nozzle arrangements also include nozzles with a plurality of main holes and no separate pilot holes in which the main longitudinal axis bypasses the retainer such that a main fuel jet is scraped by the retainer and scraped fuel is retained and redirected such that an ignitable fuel-air mixture is formed within the annular mixing space. The igniter is actuated to ignite the ignitable fuel-air mixtures.

34 Claims, 9 Drawing Sheets

(56) References Cited

U.S. PATENT DOCUMENTS

| | | |
|---|---|---|
| 7,040,281 B2 | 5/2006 | Crawford et al. |
| 7,162,994 B2 | 1/2007 | Li et al. |
| 7,281,515 B2 | 10/2007 | Mann et al. |
| 7,527,033 B2 | 5/2009 | Okada et al. |
| 9,790,868 B2 | 10/2017 | Huang et al. |
| 10,273,891 B2 | 4/2019 | Martin et al. |
| 11,236,662 B2 | 2/2022 | Zhang et al. |
| 11,545,816 B2 | 1/2023 | Niessner et al. |
| 2004/0069267 A1 | 4/2004 | Hilger et al. |
| 2005/0257769 A1 | 11/2005 | Li et al. |
| 2005/0279321 A1 | 12/2005 | Crawford et al. |
| 2015/0020769 A1 | 1/2015 | Huang et al. |
| 2016/0024515 A1 | 1/2016 | Preston et al. |
| 2016/0160742 A1 | 6/2016 | Willi et al. |
| 2016/0195003 A1 | 7/2016 | Könczöl et al. |
| 2017/0096932 A1 | 4/2017 | Chiera et al. |
| 2018/0142632 A1 | 5/2018 | Martin et al. |

OTHER PUBLICATIONS

International Search Report and Written Opinion of the International Searching Authority, mailed Sep. 9, 2022, for International Application No. PCT/CA2022/050885, 9 pages.

APPARATUSES AND METHODS FOR FUEL INJECTION AND IGNITION IN AN INTERNAL COMBUSTION ENGINE

TECHNICAL FIELD

The present application relates to injecting and igniting fuel in an internal combustion engine, particularly injecting and igniting fuels having a high autoignition temperature including gaseous fuels such as natural gas and hydrogen, and more particularly relates to an internal combustion engine that employs injection of fuel directly into a combustion chamber.

BACKGROUND

Ignition is a key problem for internal combustion engines employing fuels having autoignition temperatures too high to consistently ignite at the end of compression-stroke temperature for diesel engines: such as gaseous fuels including natural gas and hydrogen, as well as some liquid fuels including methanol and propanol. As a result, engines fueling with these fuels require positive ignition sources such as pilot diesel, glow plug or spark plug to achieve reliable ignition. The use of diesel fuel as a pilot fuel increases the complexity of the fuel system that handles both fuels. On the other hand, although glow plugs or spark plugs have the potential to achieve mono-fuel operation, in a conventional axisymmetric combustion chamber configuration, a single glow plug or spark plug cannot ignite all the fuel jets simultaneously, which leads to unreliable engine operation, high unburned hydrocarbon emissions and low efficiency.

The state of the art is lacking in techniques for igniting fuels with high autoignition temperatures in direct injection internal combustion engines. The present apparatus and method provide a technique for improving the ignition of such fuels in a direct injection internal combustion engine.

SUMMARY

An improved apparatus for injecting and igniting fuel in an internal combustion engine includes a nozzle with a bore and a tip at a distal end. The bore includes a longitudinal axis and an annular valve seat. A needle reciprocates within the bore and in combination with the annular valve seat forms an injection valve where in a closed position the needle abuts the annular valve seat and in an open position the needle is spaced apart from the annular valve seat. A retainer axially protrudes from the tip of the nozzle along the longitudinal axis thereof whereby an annular mixing space extends between the retainer and the tip of the nozzle. There is an igniter secured to the nozzle that includes a positive-ignition source forming an ignition zone within a portion of the annular mixing space. The nozzle includes one of (1) a pilot hole and a first main hole in the nozzle extending between the plenum and outside the nozzle with a first main hole longitudinal axis bypassing the retainer: a pilot fuel jet from the pilot hole is retained and redirected such that an ignitable fuel-air mixture is formed within the annular mixing space; and (2) a second main hole in the nozzle with a second main longitudinal axis bypassing the retainer such that a main fuel jet from the second main hole is scraped by the retainer and scraped fuel is retained and redirected such that an ignitable fuel-air mixture is formed within the annular mixing space. The igniter is actuated to ignite the ignitable fuel-air mixture.

In exemplary embodiments with at least one nozzle pilot hole, the pilot hole injection angle ($\theta$) is preferably between 0 degrees and 45 degrees between the bore longitudinal axis and a pilot hole longitudinal axis. The nozzle main holes have a first main hole injection angle ($\beta$) between 50 degrees and 85 degrees between the bore longitudinal axis and a first main hole longitudinal axis. The cross-sectional flow area of the pilot hole is preferably between a range of 5% to 15% of a cross-sectional flow area of the main hole. A portion of fuel flows through the pilot hole expanding and impacting the annular retaining surface so that fuel flow redirects from a substantially vertical direction to a radial and circumferential directions relative to a nozzle bore longitudinal axis 600 within a mixing space. In some embodiments, the retainer has a slope angle ($\lambda$) near to and including 90 degrees, relative to the bore longitudinal axis 600 of the nozzle when the pilot hole injection angle $\theta$ is near to or at 0 degrees. A tangent to a portion of an arced shaped annular retaining surface that intersects the pilot hole longitudinal axis can be orthogonal to the pilot hole longitudinal axis.

In other exemplary embodiments, the nozzle does not have one or more separate pilot holes, but rather has main holes with a main hole injection angle ($\omega$) preferably between 15 degrees and 75 degrees between the nozzle bore longitudinal axis and the second main hole longitudinal axis. Between 0.1% and 10% of the fuel in the main fuel jet is scraped by the retainer and mixed within the annular mixing space.

The upper annular retaining surface of the retainer is sloped inwardly and can have a slope angle ($\lambda$) of 45 degrees to 90 degrees relative to the bore longitudinal axis 600 of the nozzle for retaining the ignitable fuel-air mixture within the annular mixing space. The upper annular retaining surface of the retainer can be arced shaped forming a bowl for retaining the ignitable fuel-air mixture within the annular mixing space.

A post member connects the retainer to the nozzle tip and can be axisymmetric with bore longitudinal axis. The nozzle, the post member and the retainer can be an integrated component, in which case embodiments having a pilot hole can form the pilot hole by drilling or boring through retainer. The positive-ignition source can include a heated surface or an electrode which forms a spark gap between the igniter and the retainer and/or between the igniter and the nozzle. The integrated igniter can be an elongate member with the positive-ignition source at a first distal end and an electrode at a second distal end. The electrode of the igniter can be electrically connected to an electrical conductor in the nozzle whereby an ignition signal is delivered to the positive-ignition source through the electrical conductor.

In some applications it is beneficial to provide a slot in a lower portion of the nozzle for supporting the igniter. To secure the igniter to the nozzle, threads near the second distal end of the igniter can be received by corresponding threads in a second bore formed in an upper portion of the nozzle. The igniter can also include an insulated portion between the positive-ignition source at the first distal end and the electrode at the second distal end. A lower portion of the nozzle and the igniter including at least a part of the insulated portion of the igniter extends into a combustion chamber of the engine, while the upper portion of the nozzle can be substantially located within a bore in the cylinder head of the engine when the apparatus is installed in the engine.

For some applications, the injection valve is actuated to an open position to inject fuel in a pilot injection event preferably between 90 and 160 crank angle degrees before top dead center during a compression stroke, and the injection valve is actuated to an open position to inject fuel in a main injection event preferably between 110 and 180 crank angle degrees before top dead center during a compression stroke. The injection valve can be actuated to inject fuel at injection pressures nominally between 200-800 bar. Fuel having an autoignition temperature above 350 degrees Celsius, and/or gaseous fuels such as hydrogen, methane, propane, natural gas, ammonia, or mixtures are of particular benefit to the apparatus and techniques disclosed herein. Liquid fuels having high autoignition temperatures and low boiling points such as methanol, ethanol, propanol, butanol or blends where sufficient atomization upon injection occurs and more preferably vaporization occurs to allow good mixing with in-cylinder air also benefit from the apparatuses and techniques described herein.

BRIEF DESCRIPTION OF THE DRAWINGS

The accompanying drawings, which are incorporated into and constitute a part of the specification, illustrate specific embodiments of the apparatus, systems, and methods and, together with the general description above, and the detailed description of the specific embodiments, serve to explain the principles of the apparatus, systems, and methods.

DETAILED DESCRIPTION

Figure 1:
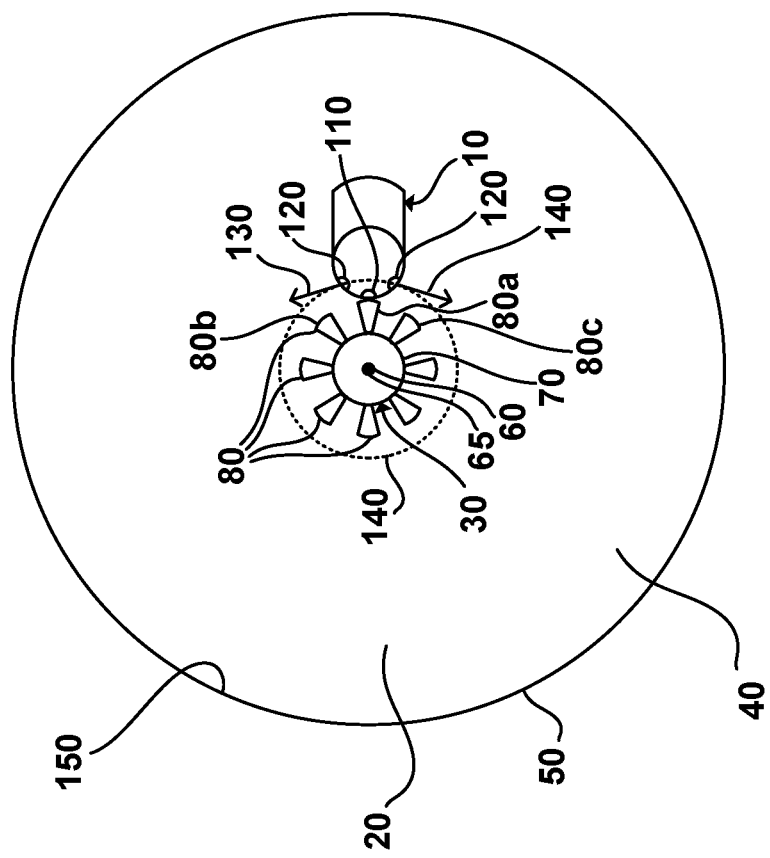
FIG. 1 is a schematic view of an engine cylinder, a fuel injector and a shielded igniter illustrating a plurality of pilot fuel jets according to an exemplary embodiment.

Referring to the figures and first to FIGS. 1, 2, 3 and 4, there is shown shielded igniter 10 in combustion chamber 20 of an internal combustion engine that is employed to ignite fuel having a high autoignition temperature, and more particularly that operates as a single point igniter that ignites the fuel at a single location or region in the combustion chamber. Although only one combustion chamber 20 is illustrated in FIG. 1, there can be one or more combustion chambers in the internal combustion engine. Exemplary fuels having high autoignition temperature (above 350° C. herein); particularly gaseous fuels such as natural gas and hydrogen, as well as liquid fuels with low boiling points such as methanol and propanol where sufficient atomization upon injection occurs and more preferably vaporization occurs to allow good mixing with in-cylinder air are contemplated. As used herein, a gaseous fuel is any fuel that is in the gas state at standard temperature and pressure, which is defined herein as a temperature of 0) degrees Celsius (0° C.) and an absolute pressure of 100,000 Pascals (100 kPa) respectively. Although any type of gaseous fuel can be employed, methane, propane, natural gas, ammonia and hydrogen (or mixtures thereof) are gaseous fuels that are contemplated. Similarly, as used herein, liquid fuels are any fuel in liquid form at standard temperature and standard pressure. Suitable liquid fuels are those with low boiling points such as methanol, ethanol, propanol, butanol and blends thereof are also contemplated. An injection pressure and an injection temperature of the fuel are selected such that the fuel is preferably in the gas state or supercritical state when it is injected. As an example, propane is stored in the liquid state at typical storage pressures and temperatures. The temperature of the liquid propane can be increased prior to injection to evaporate the liquid propane into the gas state. In an exemplary embodiment fuel injector 30 (seen in FIG. 1) is centrally located in cylinder head 40, preferably symmetrically around longitudinal axis 60 of cylinder 50, like in a conventional diesel engine. Combustion chamber 20 is defined by cylinder head 40, cylinder 50 and a piston (not shown). Fuel injector 30 includes nozzle 70 having a plurality of nozzle holes for injecting fuel in the form of jets 80, and preferably in the form of gas jets into combustion chamber 20. Fuel jets 80 are injected into combustion chamber 20 typically above an injection pressure of 200 bar, and preferably within a range of 200 bar to 700 bar, near top dead center (TDC) during the compression stroke. As used herein, injection pressure is defined as the pressure of the fuel within fuel injector 30 and in a fuel rail (not shown) in fluid communication with fuel injector 30, for example when the fuel injector is closed and not injecting fuel. In the illustrated exemplary embodiment, there are eight nozzle holes through which eight jets 80 are injected, although in other embodiments there can be a different number of nozzle holes. Preferably the nozzle holes are equally spaced around a circumference of nozzle 70, although this is not a requirement. Depending on the engine system, shielded igniter 10 is adaptable to couple to the engine or to the fuel injector such that it is disposed near fuel injector 30 to ignite jets 80 as will be explained in more detail below.

Figure 2:
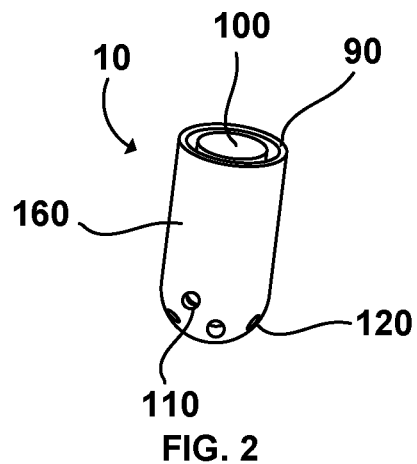
FIG. 2 is a perspective view of the shielded igniter of FIG. 1.
Figure 3:
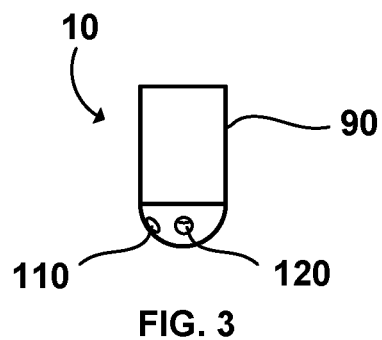
FIG. 3 is a side elevational view of the shielded igniter of FIG. 1.
Figure 4:
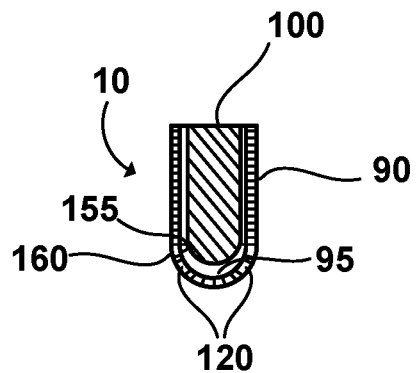
FIG. 4 is a cross-sectional view of the shielded igniter of FIG. 1 taken along a longitudinal centerline of the shielded igniter.

With reference to FIGS. 2, 3 and 4, shielded igniter 10 includes shield 90 surrounding positive-ignition source 100 that in the illustrated exemplary embodiment is a heated surface. In alternative embodiments positive-ignition source 100 can be a spark igniter, a corona-discharge igniter or an induction-heating igniter. Shield 90 includes at least one inlet hole 110 and at least two outlet holes 120 (also referred to as inlet and outlet passageways 110 and 120 respectively). Inlet hole 110 is disposed facing one of the plurality of nozzle holes such that the resulting jet (gas jet 80a seen in FIG. 1) is directed towards the inlet hole. Gas jet 80a can be aimed directly at inlet hole 110 or at an impingement point on outer surface 160 of shield 90 located around inlet hole 110, such that by momentum and/or diffusion an ignitable fuel-air mixture is established in shielded space 95 (shown in FIG. 4) between shield 90 and positive-ignition source 100. It is noteworthy that gas jets 80 tend to expand more rapidly in combustion chamber 20 compared to liquid fuel jets. As a result, when gas jet 80a is aimed at inlet hole 110 a portion of the plume of gas jet 80a enters the inlet hole while the rest of the plume impacts the area surrounding inlet hole 110 or misses shielded igniter 10. Gas jet 80a entrains air as it travels towards shielded igniter 10 and mixes further with air as it collides with shield 90. Gaseous fuel and air enter inlet hole 110 to mix further with air inside shielded igniter 10. The fuel-air mixture in shielded space 95 inside shielded igniter 10 ignites when the pressure and temperature environment therein reaches a condition suitable for ignition, and likely when the ignitable fuel-air mixture is near to or in contact with positive-ignition source 100 after it has been actuated with an ignition signal to ignite the fuel-air mixture. As combustion proceeds within shielded igniter 10 the pressure therein increases. Combustion products are expelled through outlet holes 120 due to momentum resulting from combustion inside shielded space 95 and/or a positive pressure differential between shielded space 95 and combustion chamber 20.

Outlet holes 120 are arranged within shield 90 such that an exit trajectory of combustion products from shielded space 95 inside shielded igniter 10 through outlet holes 120 is along azimuthal direction 130 of cylinder 50 (seen in FIG. 1), that is in a direction tangential to circumference 140. Circumference 140 is axisymmetric with respect to longitudinal axis 65 of fuel injector 30. In the illustrated exemplary embodiment, circumference 140 is also axisymmetric with respect to circumference 150 of cylinder 50, that is longitudinal axis 60 of cylinder 50 is coaxial with longitudinal axis 65 of fuel injector 30. However, it is contemplated that circumference 140 and circumference 150 are coaxial within a range of tolerance. For example, fuel injector 30 may be installed such that longitudinal axis 65 is offset from longitudinal axis 60 for a variety of reasons. Circumference 140 is that circumference upon which at least one outlet hole and preferably both outlet holes 120 are disposed and that extends through one or preferably both outlet holes 120, as shown in FIG. 1. The trajectory of the combustion products exiting outlet holes 120 is determined by a combination of features including an orientation of outlet holes 120 with respect to inner surface 155 and outer surface 160 of shield 90 (seen in FIG. 4), as well as the diameter and the length of outlet holes 120. The combustion products exiting first outlet hole 120b and second outlet hole 120c of outlet holes 120 form a torch that ignites fuel jets 80b and 80c respectively as seen in FIG. 1: fuel jets 80b and 80c are adjacent jet 80a and shielded igniter 10. Fuel jets 80b and 80c have sufficient time to mix with air and reach an improved and preferably optimal fuel-air mixture when combustion products ejected along the azimuthal direction 130 reach jets 80b and 80c. Additionally, portions of jet 80a that extend around shielded igniter 10 may also ignite when near or in contact with combustion products exiting holes 120. As jets 80b and 80c combust the remaining fuel jets 80 have also mixed with air to form an ignitable fuel-air mixture cloud around fuel injector 30 such that the combustion of jets 80a, 80b and 80c cause the ignitable fuel-air mixture cloud to ignite and combust around fuel injector 30.

Figure 5:
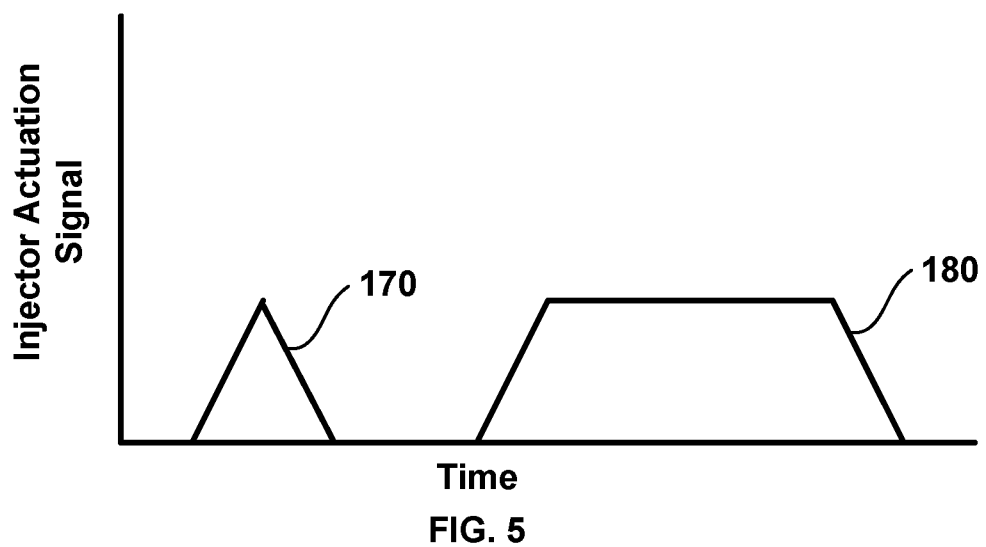
FIG. 5 is a chart view of an injector actuation signal illustrating a pilot pulse in a pilot injection event and a main pulse in a main injection event.

Referring now additionally to FIG. 5, an exemplary ignition process employs a pilot injection event followed by a main injection event and is summarized as follows. During a compression stroke within combustion chamber 20, when the piston moves towards the top dead center (TDC) position, a pilot quantity of gaseous fuel is injected by sending pilot actuation signal 170 to fuel injector 30 during the pilot injection event. Pilot actuation signal 170 can be described as a short pulse. Gaseous fuel from pilot jet 80a enters through inlet hole 110 of shield 90 of shielded igniter 10. The quantity of the gaseous fuel entering shield 90 is controlled by the actuation signal pulse width, the size and the orientation of inlet hole 110, and the size and positions for outlet holes 120 on shield 90. The fuel inside the shield is ignited near or at positive-ignition source 100, which in the illustrated exemplary embodiment is a hot surface of a glow plug, but in other embodiments can be an electric discharge from a spark plug. This leads to an increase in the temperature and pressure inside the shield, and discharge of the combustion products from shielded space 95. The discharge of the high-temperature combustion products from shielded igniter 10 ignites jets 80b and 80c adjacent to the igniter and the flame propagates around the injector nozzle 70. A short delay after the pilot injection event, main actuation signal 180 is sent to fuel injector 30 to start the main injection event of a main quantity of fuel, which is a larger amount compared to the pilot quantity of fuel injected during the pilot injection event. Main actuation signal 180 can be described as a long pulse (that is, a long pulse compared to the short pulse of the pilot actuation signal 170). The main fuel jets (not shown) exit the same nozzle holes in fuel injector 30 as pilot jets 80 and are ignited by the pilot flame and combustion products of the pilot fuel around the injector nozzle 70.

Figure 6:
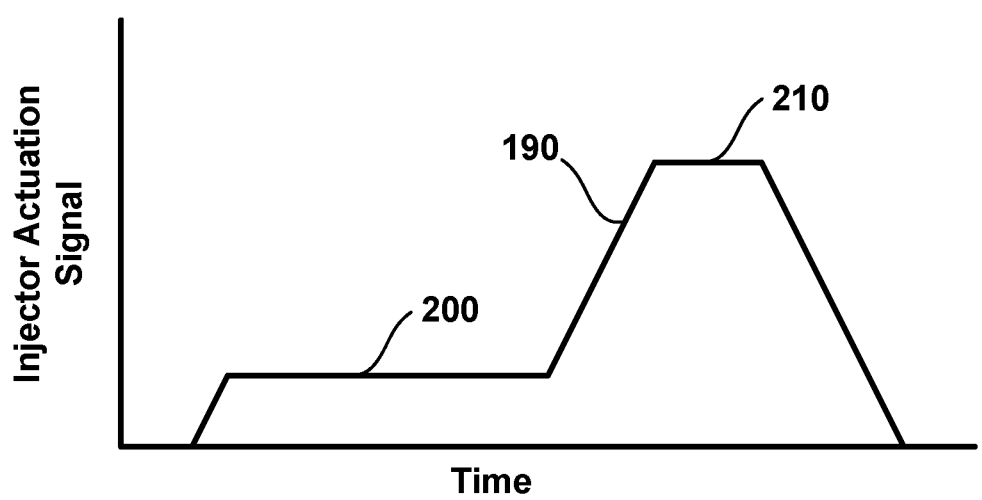
FIG. 6 is a chart view of an injector actuation signal illustrating a stepped pulse having a pilot injection step and a main injection step.
Figure 7:
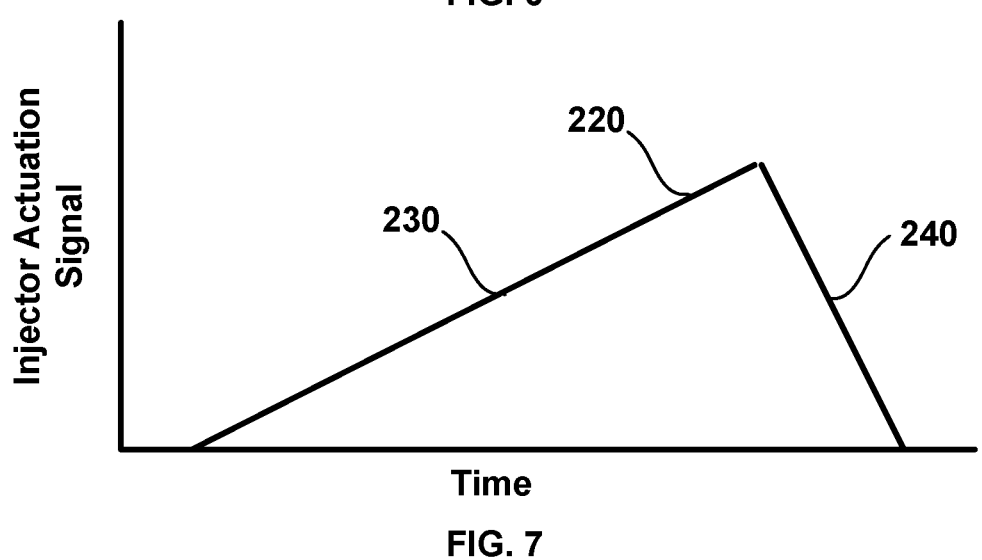
FIG. 7 is a chart view of an injector actuation signal illustrating a ramped pulse.

In other embodiments a stepped injection strategy can be employed, as shown in FIG. 6, where actuation signal 190 includes pilot injection step 200 followed by main injection step 210. Alternatively, a ramped injection strategy can be employed as shown in FIG. 7 where actuation signal 220 is in the form of a sawtooth including rising edge 230 and falling edge 240, where typically rising edge 230 has a smaller slope than falling edge 240, although this isn't a requirement. In other embodiments, rising edge 230 can include a pilot rising edge preceding and having a smaller slope than a main rising edge. In still other embodiments rising edge 230 can have a concave shape where the concave shape starts off with a shallow slope that increases in time, where the shallow slopes are associated with a pilot stage and larger slopes are associated with a main stage.

Shielded igniter 10 and the way it is employed as previously discussed offers improved conditions for achieving stable ignition. Pilot injections that introduce a small amount of fuel into combustion chamber 20 reduce surface cooling of positive-ignition source 100 (when the igniter is a heated surface), which reduces the local strain rate, and increases the residence time of the fuel around the igniter since the penetration distance into combustion chamber 20 is reduced for smaller injection amounts. Shield 90 also increases the residence time of the fuel and provides a more quiescent environment for the ignitable fuel-air mixture around positive-ignition source 100 as well as control over the local fuel/air ratio increasing the probability and robustness of ignition. Short pilot pulses to fuel injector 30 that inject small pilot amounts of fuel limit the penetration of fuel jets 80, which increases the probability of fast flame propagation around nozzle 70 after ignition. The delay between pilot and main injections can be adjusted based on engine operating conditions and igniter types (that is, heated surface vs spark) to ensure robust ignition.

Figure 8:
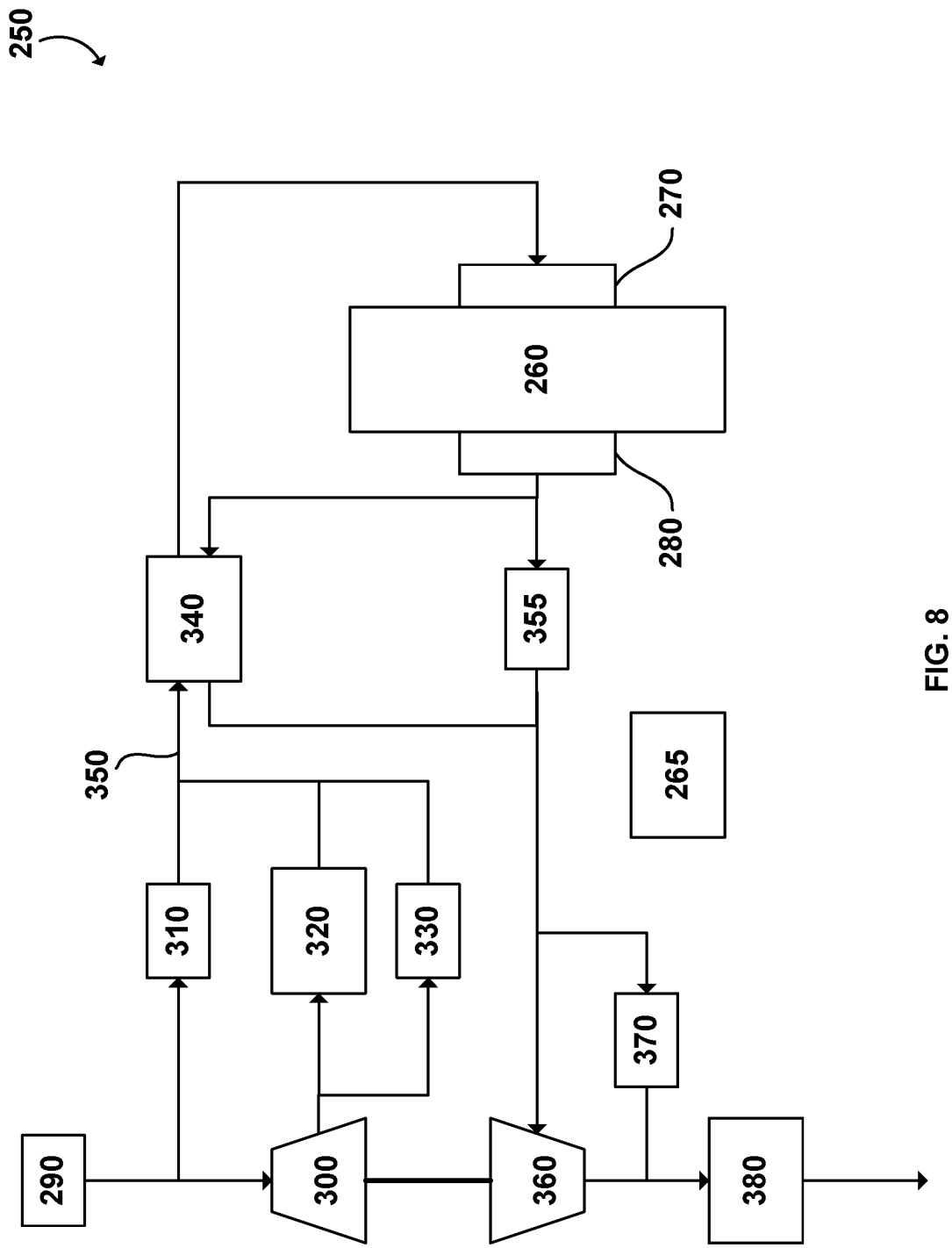
FIG. 8 is a schematic view of an internal combustion engine employing the shielded igniter of FIG. 1.

Referring now to FIG. 8, there is shown internal combustion engine system 250 that includes techniques for preheating intake air. Internal combustion engine 260 has one or more combustion chambers each employing shielded igniter 10. The path of intake air is now discussed. Intake air enters at inlet 290 and is communicated through turbo-compressor 300 when it is to be compressed (that is, boosted), or the intake air is communicated through turbo-bypass valve 310 when it is not to be compressed. The compressed intake air can be cooled through charge air cooler 320 when it is to be cooled, or the compressed intake air can retain the heat of compression by communicating it through bypass valve 330. Alternatively, the compressed intake air can be alternately or simultaneously communicated through charge air cooler 320 and bypass valve 330 when it is to be partially cooled. Bypass valve 330 can operate with a restricted orifice when only a portion of compressed air is to be communicated through bypass valve 330. Intake air downstream from bypass valves 310, 330 and charge air cooler 320 is then communicated to waste-heat heat exchanger 340 along conduit 350. Heated waste heat from exhaust manifold 280 can be routed through heat exchanger 340 to transfer heat from engine exhaust to intake air, or engine exhaust can be communicated through bypass valve 355 when intake air is not to be heated from engine exhaust. Alternatively, engine exhaust can be alternately or simultaneously communicated through heat exchanger 340 and bypass valve 355 when intake air is to be partially heated from engine exhaust. Bypass valve 355 can operate with a restricted orifice when only a portion of engine exhaust is to be communicated through bypass valve 355. Intake air from waste-heat heat exchanger 340 is then communicated to intake manifold 270. Engine exhaust from either heat exchanger 340 or bypass valve 355 can be employed to drive turbine 360 that in turn drives compressor 300. Alternatively, engine exhaust can be communicated through bypass valve 370. Engine exhaust from either turbine 360 or bypass valve 370 is communicated through aftertreatment system 380. In system 250, intake air can be heated during pressurization from compressor 300 and/or by heat from hot engine exhaust through heat exchanger 340. Controller 265 is operatively connected, for example electrically connected, to valves 310, 330, 355, 370 and commands the valves accordingly. In other embodiments, alternatively or additionally, engine coolant can be communicated through heat exchanger 340 or another heat exchanger to heat intake air. Heated intake air results in a more ignitable fuel-air mixture within shielded igniter 10 in each combustion chamber of engine 260. The load on positive-ignition source 100 (seen in FIG. 2) is reduced by heating the intake air (that is, the required ignition energy from the heated surface or the spark igniter is reduced).

Figure 10:
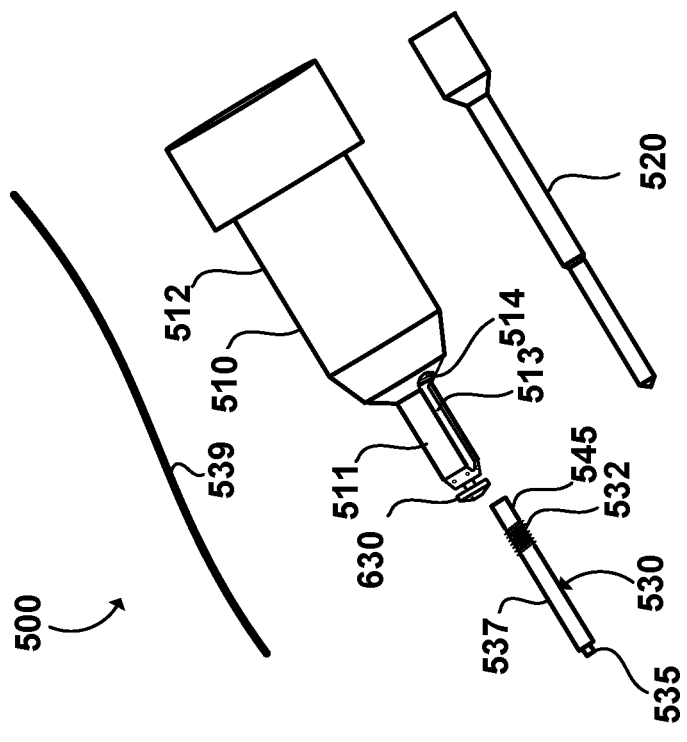
FIG. 10 is an exploded view of the nozzle assembly of FIG. 9.
Figure 9:
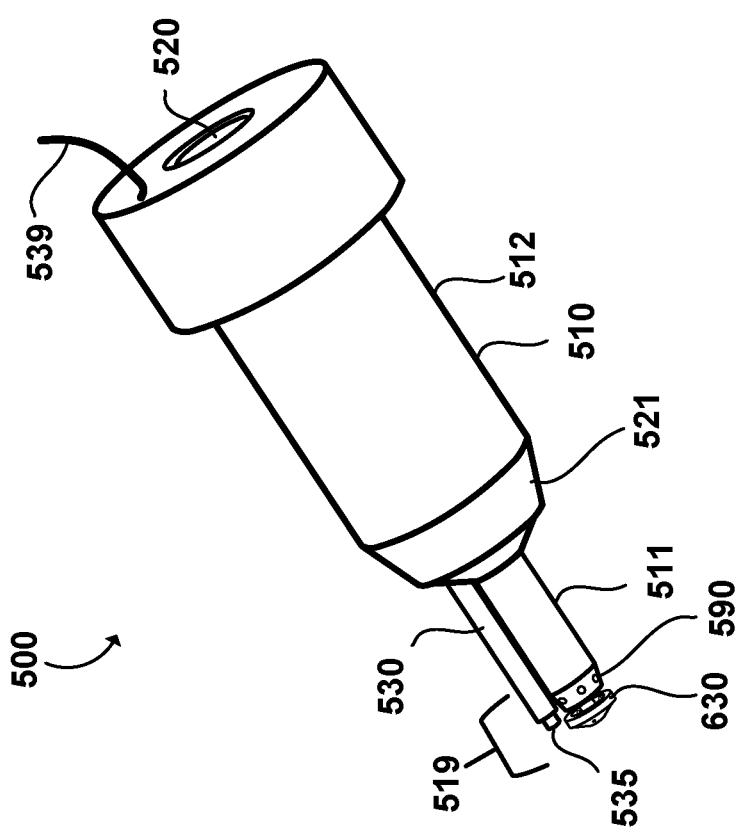
FIG. 9 is a perspective view of a nozzle assembly for an integrated fuel injector-igniter according to another exemplary embodiment.
Figure 11:
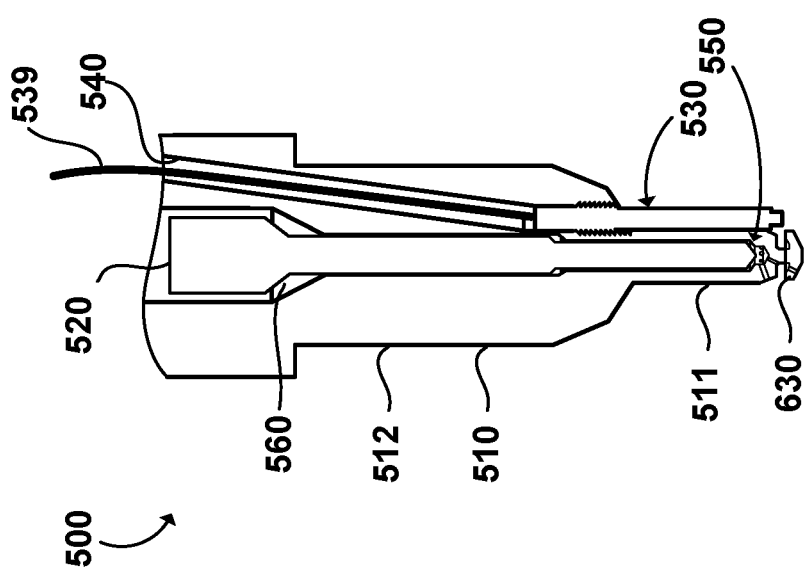
FIG. 11 is a cross-sectional view of the nozzle assembly of FIG. 9.
Figure 14:
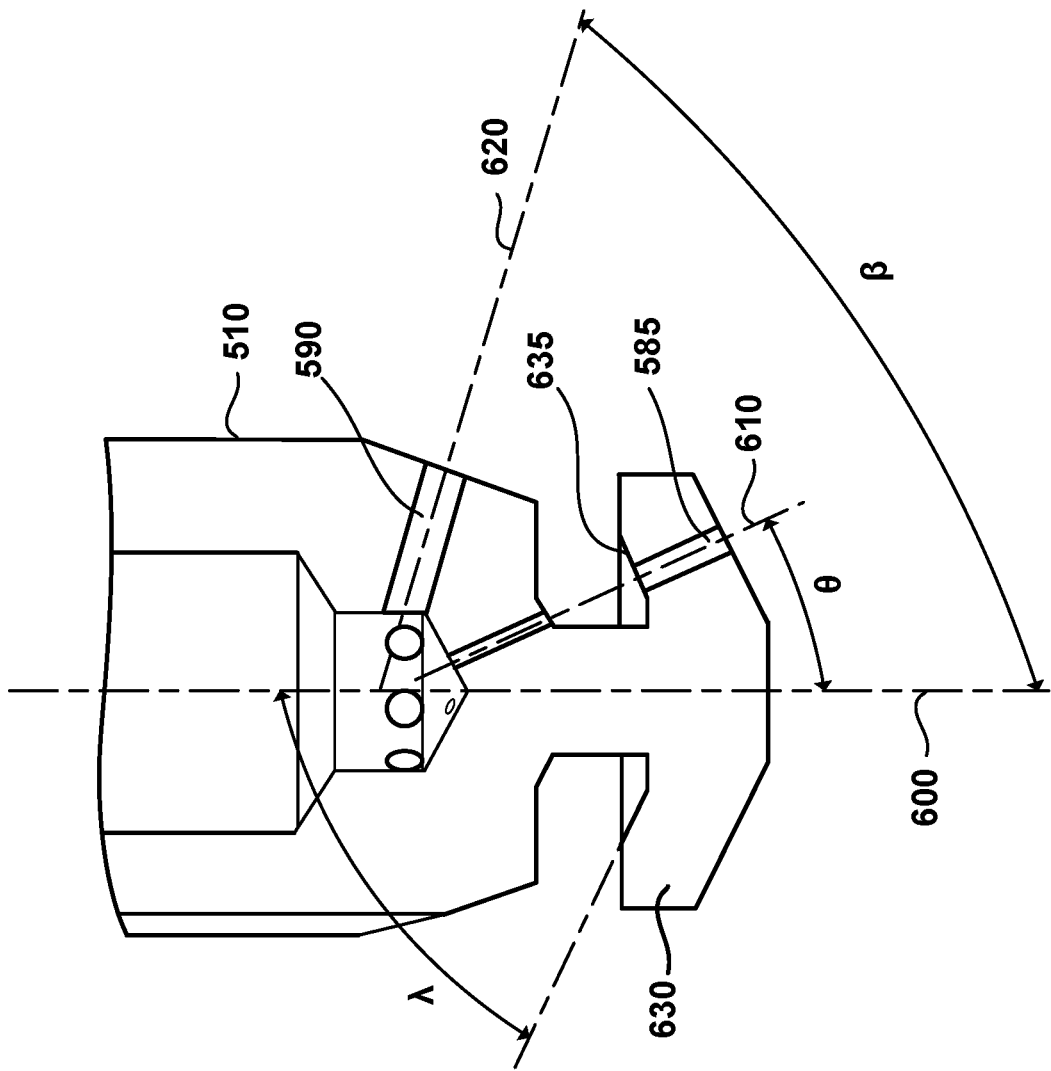
FIG. 14 is a detail view of a portion of the nozzle of FIG. 13.
Figure 13:
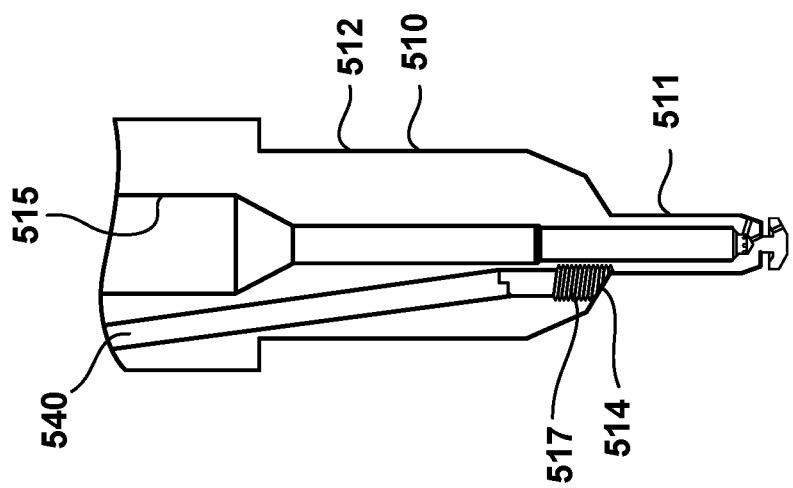
FIG. 13 is a cross-sectional view of a nozzle of the nozzle assembly FIG. 9.

Referring now to FIGS. 9 through 14 there is shown nozzle assembly 500 employed in an integrated injector-igniter according to another exemplary embodiment. Nozzle assembly 500 preferably is located centrally in the cylinder head within the combustion chamber like fuel injector 30 seen in FIG. 1. In the integrated injector-igniter, nozzle assembly 500 is connected to an upper injector body (not shown) that includes a fuel inlet, electrical inputs for separate injector and igniter actuation and an actuation mechanism for activating the injector. Nozzle assembly 500 includes nozzle 510 and needle 520 as seen in FIGS. 10 and 11. The integrated injector-igniter can be directly actuated, where needle 520 is directly acted upon, for example, by a solenoid, a piezoelectric actuator or a magnetostrictive actuator. Alternatively, the integrated injector-igniter can be hydraulically actuated where a hydraulic fluid is employed to control the movement of needle 520 and where typically one or more solenoids is employed to control the pressure of the hydraulic fluid in one or more control chambers in fluid communication with needle 520. In this circumstance the upper injector body includes a hydraulic fluid inlet and outlet for the hydraulic actuation. Any technique employed in a conventional upper injector body can be employed with nozzle assembly 500. When the injector-igniter is installed in an engine, preferably, at least the end of lower portion 511 identified by reference sign 519 (shown in FIG. 9) that includes pilot holes 580 (shown in FIG. 12), main holes 590, positive-ignition source 535 and retainer 630 of nozzle 510 extends into the combustion chamber. The remaining part of lower portion 511 is within a fire deck (not shown) of the cylinder head. Upper portion 512 of nozzle 510 is substantially located within a bore in the cylinder head that receives the integrated-injector igniter, typically forming a combustion seal around annular surface 521, although these are not requirements.

Needle 520 is received within bore 515 (best seen in FIG. 13) of nozzle 510 such that space 560 (seen in FIGS. 11, 12) between the needle and the nozzle is in fluid communication with the fuel inlet (not shown) in the upper injector body and operates as a fluid passageway. Fuel injection valve 550, formed between needle 520 and annular valve seat 570 (best seen in FIG. 12), is in fluid communication with fluid passageway 560. Valve seat 570 is in the form of a sloped annular ledge in bore 515 in the illustrated exemplary embodiment. Fuel injection valve 550 is suitable for conveying and injecting a high pressure gaseous fluid as well as conveying and injecting liquid fluids depending on the application. Fuel injection valve is in a closed position when needle 520 abuts annular valve seat 570 and in an open position when the needle is spaced apart from the annular valve seat. Downstream from injection valve 550 is at least one pilot hole 580 and a plurality of main holes 590, both of which extend from space 560 within nozzle 510, and more particularly plenum 555, to outside the nozzle (that is, to the combustion chamber), and only one of each are fully shown. Plenum 555 is a space or volume that facilitates flow of fuel between injection valve 550 and pilot and main holes 580 and 590 respectively. In an exemplary embodiment there are three pilot holes 580, preferably evenly spaced around the circumference of nozzle 510, and seven main holes 590, also preferably evenly spaced around the circumference of the nozzle. Each pilot hole 580 is disposed such that pilot hole injection angle $\theta$ (seen in FIG. 14) between longitudinal axis 600 of nozzle 510 and longitudinal axis 610 of the pilot hole is within a range of 0 degrees to 45 degrees. Each main hole 590 is disposed such that main hole injection angle $\beta$ (seen in FIG. 14) between longitudinal axis 600 of nozzle 510 and longitudinal axis 620 of the main hole is within a range of 50 degrees to 85 degrees. In the illustrated exemplary embodiment main holes 590 exit nozzle 510 through lateral circumferential surface 525 (best seen in FIG. 12) of the nozzle. A cross-sectional flow area of pilot hole 580 is preferably between a range of 5% to 15% of a cross-sectional flow area of main hole 590.

Figure 12:
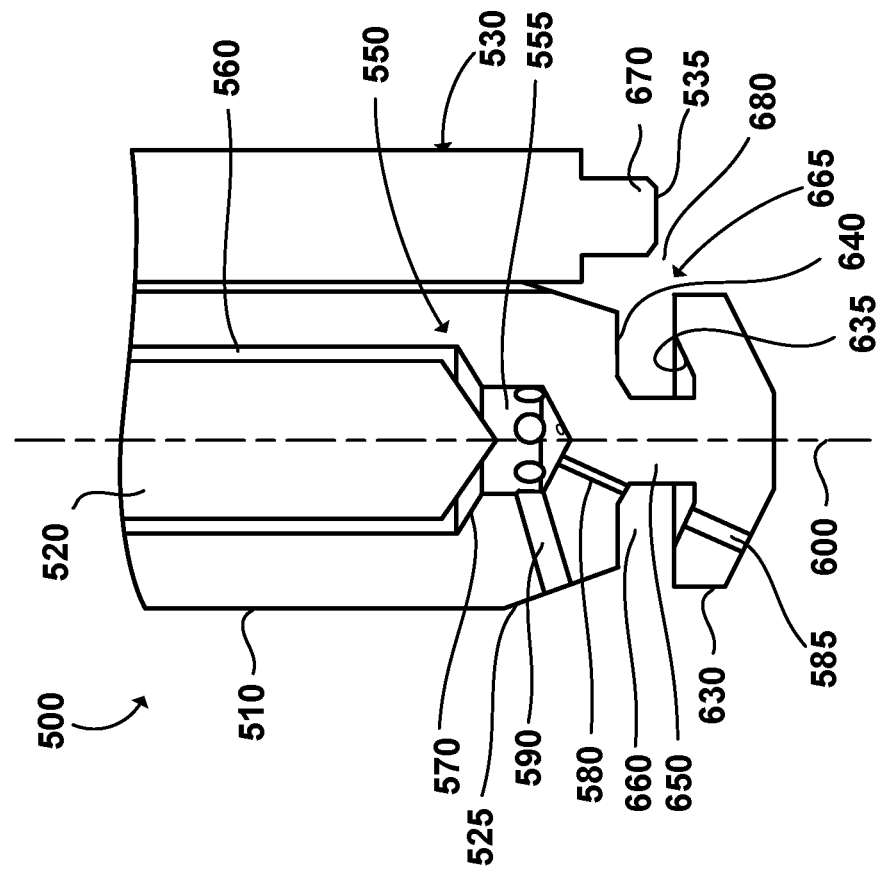
FIG. 12 is a detailed view of a portion of the nozzle assembly of FIG. 11.

With reference to FIG. 12, retainer 630 is a protruded feature axially spaced apart from tip 640 along longitudinal axis 600 (that is, retainer 630 is disposed axially beside tip 640). Annular mixing space 660 is formed between upper annular retaining surface 635 of retainer 630 and tip 640 of nozzle 510. Annular retaining surface 635 is sloped inwardly in the illustrated exemplary embodiment to enhance the retaining and redirection function. Slope angle $\lambda$ (seen in FIG. 14) of retaining surface 635 relative to longitudinal axis 600 of nozzle 510 is application specific and can be for example within a range of 45 degrees to 90 degrees. Values of slope angle λ near to and including 90 degrees can be employed when pilot hole injection angle θ is near to or at 0 degrees. In other embodiments annular retaining surface 635 can be arced shaped, for example a concave shape forming a bowl for retaining the ignitable fuel-air mixture within annular mixing space 660, where a tangent to a portion of the arched shaped annular retaining surface that intersects longitudinal axis 610 of pilot hole 580 (seen in FIG. 14) satisfies the slope angle λ requirement and preferably is orthogonal to the longitudinal axis 610. Retainer 630 is connected to tip 640 through post member 650, and preferably nozzle 510, retainer 630 and post member 650 are an integrated component (preferably metal), although this isn't a requirement and retainer 630 can be affixed to nozzle 510 by other means. Pilot hole 580 exits nozzle 510 such that longitudinal axis 610 of the pilot hole intersects retainer 630 (best seen in FIG. 14), whereby a pilot fuel jet emanating from pilot hole 580 is directed at retainer 630. In an exemplary embodiment pilot hole 580 exits through tip 640 (best seen in FIG. 12). In this circumstance pilot hole 580 can be formed by drilling or boring through retainer 630 when the retainer is integrated with nozzle 510, which is shown in the illustrated exemplary embodiment by hole 585 seen in FIG. 12. It is noteworthy to mention that the cross-sectional flow area of pilot hole 580 is very small such that the presence of hole 585 does not adversely affect the retaining function of retainer 630 as will be explained in more detail below. Main hole 590 exits nozzle 510 such that longitudinal axis 620 of the main hole bypasses retainer 630 (best seen in FIG. 14), whereby a main fuel jet emanating from main hole 590 is directed into the combustion chamber, for example at a wall of a cylinder or a piston reciprocating within the cylinder, substantially and preferably entirely bypassing retainer 630 such that the fuel from the main fuel jet is not retained in mixing space 660.

Nozzle assembly 500 also includes igniter 530 (seen in FIG. 9) connected with nozzle 510 and having positive-ignition source 535. In the illustrated exemplary embodiment positive-ignition source 535 is a spark igniter having electrode 670 (seen in FIG. 12). However, in other embodiments igniter 530 can be a glow-plug type igniter having a heated surface where spark igniter 670 is located. With reference to FIG. 10, igniter 530 is an elongate component that includes positive-ignition source 535 at a first distal end and electrode 545 at a second distal end and an insulated portion 537 (such as a ceramic portion) therebetween. Igniter 530 is supported by slot 513 in lower portion 511 of nozzle 510. Threads 532 near the second distal end are received by corresponding threads 517 in bore 514 (best seen in FIG. 13) in upper portion 512 of nozzle 510. Insulated electrical conductor 539 connects to electrode 545 and is inserted into bore 514 and fed through bore 540 before igniter 530 is screwed into nozzle 510 (best seen in FIG. 11). Insulated electrical conductor 539 connects to the electrical input for igniter actuation in the upper injector body referred to above, that in turn is connected to an external ignition signal generator (not shown), such as a driver or a controller, that generates an electrical signal delivered to positive-ignition source 535 during an ignition event along with conductor 539 for generating either a spark, as will be explained in more detail below, or a heated surface around an outer surface of positive-ignition source 535. Positive-ignition source 535 forms ignition zone 665 (seen in FIG. 12) within a portion of mixing space 660. In an exemplary embodiment positive-ignition source 535 is an electrode 670 disposed to form spark gap 680 between retainer 630 and electrode 670. Alternatively or additionally, spark gap 680 can be between electrode 670 and nozzle tip 640. In other embodiments positive-ignition source 535 is instead a heated member that creates a heated surface at the distal end of igniter 530.

Retainer 630 functions to retain, deflect and recirculate fuel injected through pilot holes 580 within and around mixing space 660 and near to spark gap 680 within ignition zone 665, and increases residence time of fuel within mixing space 660 and ignition zone 665. An ignitable fuel-air mixture forms around mixing space 660 that is ignited by igniter 530. A boundary of the mixing space 660 can extend radially outwardly from retainer 630 since the ignitable fuel-air mixture can spread through momentum and/or diffusion. Injection strategies as illustrated in FIGS. 5, 6 and 7 can be employed to ignite the ignitable fuel-air mixture, and preferably, the double pulse injection strategy as illustrated in FIG. 5. Retainer 630 features a structure that retains and redirects some of the fuel to facilitate ignition and flame propagation during the pilot fuel jet ignition phase. During the pilot injection event (or first injection event) pilot actuation signal 170 (seen in FIG. 5) activates injection valve 550 to introduce a pilot quantity of fuel through pilot holes 580 and main holes 590. A portion of fuel that flows through pilot holes 580 expands and impacts annular retaining surface 635 that redirects the fuel flow from the substantially vertical direction to the radial and the circumferential directions relative to longitudinal axis 600 within mixing space 660. In another exemplary embodiment, there is only one pilot hole 580 whereby retainer 630 deflects and distributes the pilot fuel around mixing space 660 and nozzle tip 640. The injection of the pilot quantity of fuel is more accurately controlled by using one or a small number of pilot holes 580. At or near the end of pilot actuation signal 170, igniter 530 is actuated to create a spark across spark gap 680. That is, an ignition signal is sent down conductor 539 to build up an electrical potential across spark gap 680 to a point where an electric spark discharges across the spark gap into retainer 630 and/or nozzle tip 640 that operate as a second electrode. The retainer is electrically connected to nozzle 510, which is itself electrically connected with an electrical return path for the ignition signal. The discharge of electrical energy into a small region near retainer 630 and tip 640 of nozzle 510 ignites the fuel-air mixture in mixing space 660. The local flame front from the spark discharge propagates around tip 640 through mixing space 660 forming a pilot flame. During a main injection event (or second injection event) main actuation signal 180 (seen in FIG. 5) activates injection valve 550 to introduce a main quantity of fuel through pilot holes 580 and main holes 590, which is then ignited by the pilot flame to complete the combustion process. A time delay between the pilot and main injection events (or pulses) is sufficiently long so that a diffusion flame and combustion products from mixing space 660 (resulting from combustion of the pilot quantity of fuel) can reach and ignite that portion of the pilot quantity of fuel introduced through main fuel holes 590 during the pilot injection event. During both the pilot injection event and the main injection event fuel flows through both the pilot holes 580 and main holes 590. The difference between these two events other than the injection timing is the main quantity of fuel is much larger than the pilot quantity of fuel, and positive-ignition source 535 is actuated during the pilot injection event.

Nozzle assembly 500 and the way it is employed as previously discussed offers improved conditions for achieving stable ignition. It allows high pressure, direct injection and combustion of gaseous fuels without the need of a pilot liquid fuel (like diesel) for ignition. Little if any modification or machining is required for the baseline diesel engine to employ nozzle assembly 500. This technique can work for a variety of fuels. The injection strategies as shown in FIGS. 5, 6 and 7 increase the robustness of the ignition and combustion by introducing a smaller amount of fuel in a pilot stage before a larger amount of fuel is provided in a main stage.

Figure 15:
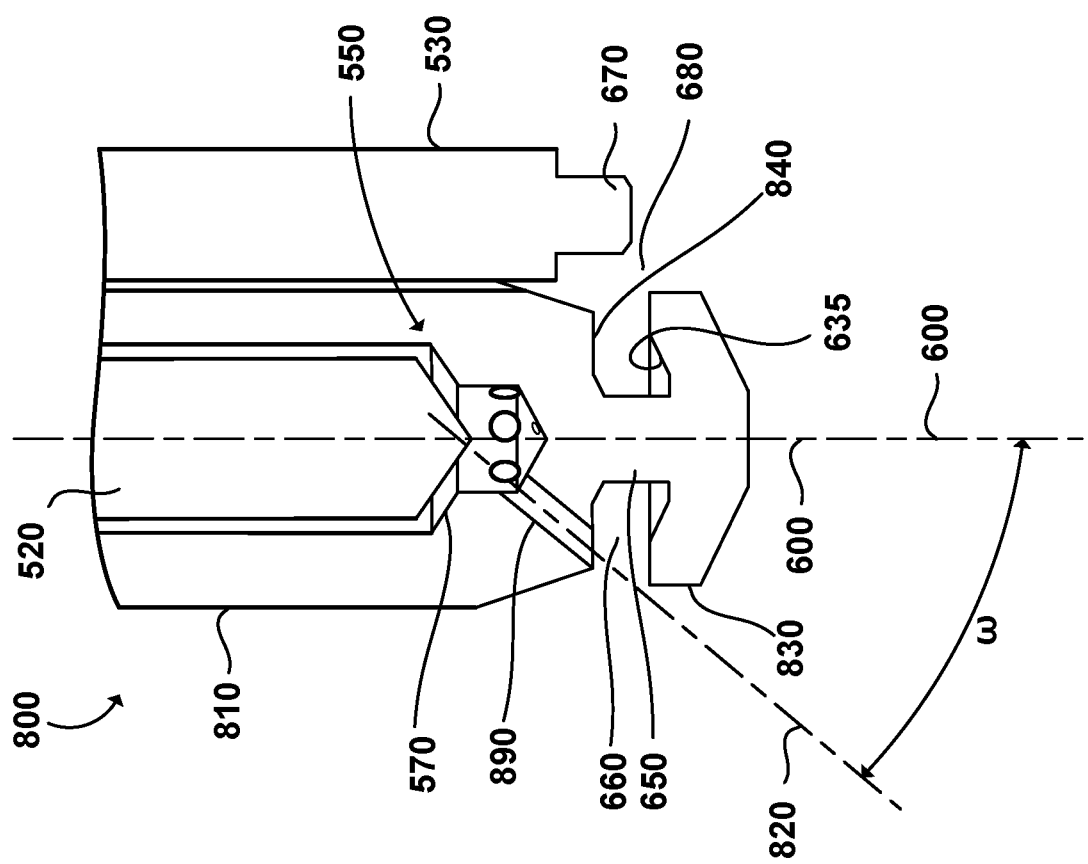
FIG. 15 is a cross-sectional view of a nozzle assembly for an integrated fuel injector-igniter according to another exemplary embodiment.
Figure 16:
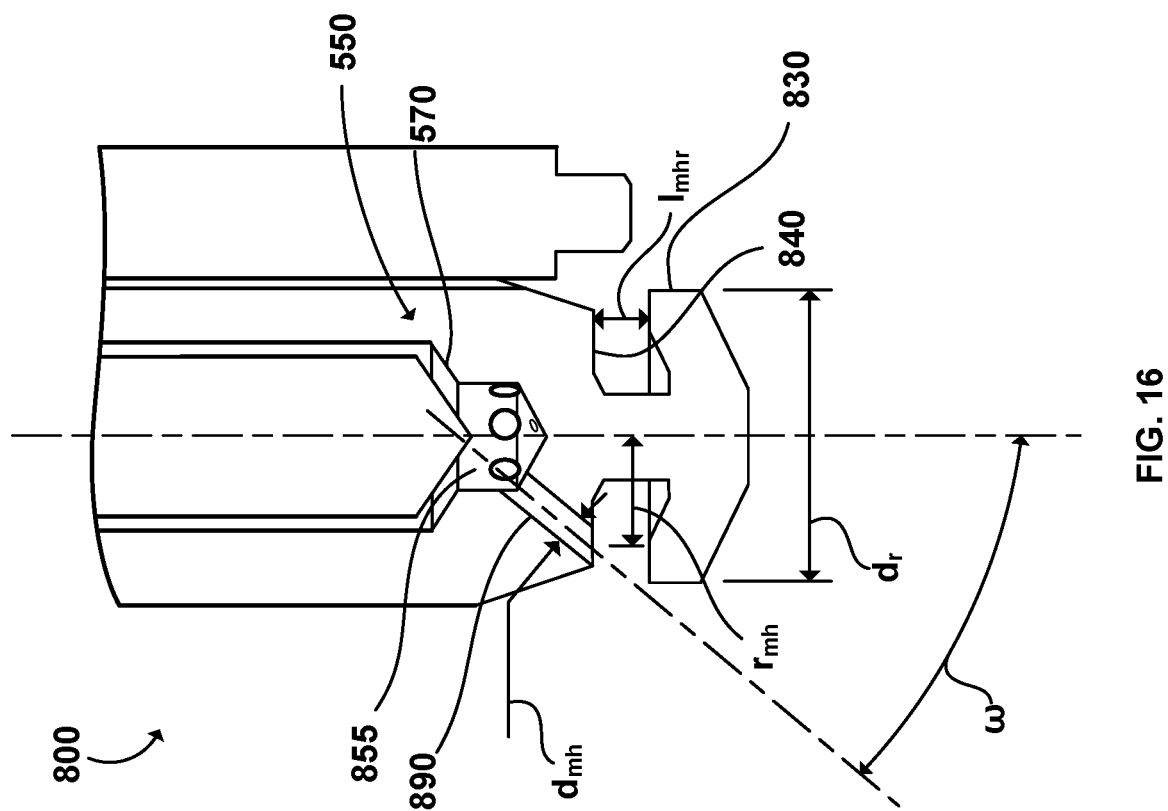
FIG. 16 is a cross-sectional view of the nozzle assembly of FIG. 15.

Referring now to FIG. 15, there is shown nozzle assembly 800 employed in an integrated injector-igniter according to another exemplary embodiment where like parts to nozzle assembly 500 have like reference numerals and may not be described in any further detail. Nozzle 810 includes a plurality of main holes 890 each having longitudinal axis 820 respectively. Nozzle 810 does not include any pilot holes, in contrast to nozzle 510 seen in FIG. 12 that includes both at least one pilot hole 580 and typically a plurality of main holes 590. Each main hole 890 is disposed such that main hole injection angle ω between longitudinal axis 600 of nozzle 810 assembly and longitudinal axis 820 of the main holes is within a range of 15 degrees to 75 degrees. Main hole 890 exits nozzle 810 such that longitudinal axis 820 of the main hole bypasses retainer 830, whereby a main fuel jet emanating from main hole 890 is directed into the combustion chamber, for example at a wall of a cylinder or a piston reciprocating within the cylinder, substantially but not entirely bypassing retainer 830. In an exemplary embodiment, main holes 890 inject fuel at a much steeper angle into the combustion chamber compared to main holes 590 of nozzle 510. During an injection event fuel is injected in a plurality of main gas jets. As the main gas jets penetrate into the combustion chamber they expand into plumes such that a portion of the main gas jets come into contact with retainer 830, and that portion of the main gas jet gets scraped off and is retained, redirected and mixed within mixing space 660. In an exemplary embodiment between 0.1% and 10% of the fuel in the main gas jet is scraped off and mixed within mixing space 660, and more preferably between 0.1% and 2% of the fuel is scraped off. With reference to FIG. 16, main hole injection angle ω is influenced by a variety of parameters including main hole mean exit radius $r_{mh}$, main hole diameter $d_{mh}$, retainer diameter dr and distance $l_{mhr}$ between main hole 890 and retainer 830 (illustrated as the distance between retainer 830 and tip 840). Additionally, main hole injection angle ω can be influenced by plenum 855 in some embodiments depending upon the size and position of plenum 855 downstream from fuel injection valve 550 within nozzle assembly 800. A piston that is employed in combination with nozzle assembly 800 would be shaped to provide better matching of the downward facing main fuel jets. An ignitable fuel-air mixture forms around mixing space 660 that is ignited by igniter 530.

Nozzle assemblies 500 and 800 can inject fuel into combustion chamber 20 above an injection pressure of 200 bar, and preferably within a range of 200 bar to 800 bar, near top dead center (TDC) during the compression stroke, where the upper limit is similar to standard gaseous fuel supply pressures in certain gaseous fuel systems such as those systems that employ compressed hydrogen, and there is no intended maximum injection pressure requirement. Retainers 630 and 830 are particularly suitable for gaseous fuels, including high pressure gaseous fuel jet ignition; as well as liquid fuels with low boiling points where sufficient atomization upon injection occurs and more preferably vaporization occurs to allow good mixing with in-cylinder air in contrast to liquid fuels having high boiling points that would experience poor mixing, surface wetting and carboning. Main hole injection angles β and ω influence the shape of the piston bowl to accommodate sufficient mixing. Alternatively, the shape of the piston bowl can influence the selection of main hole injection angles β and ω when the piston bowl shape cannot be changed. Generally, there should be enough space between the exit of main holes 590 and 890 and the piston bowl to allow main fuel jets to develop and penetrate into the combustion chamber to allow for sufficient mixing. Additionally, the shape of the piston bowl and the main hole injection angles β and ω are selected to reduce the trapping of fuel deep into the piston bowl that limits the mixing of the fuel throughout the combustion chamber. The embodiments described herein enable mono-fuel operation for internal combustion engines fueling with a gaseous fuel, which for example can include hydrogen, methane, propane, natural gas, ammonia or a mixture thereof; as well as other fuels such as methanol, ethanol, propanol, butanol and blends thereof. Internal combustion engine system 250 can employ the integrated injector-igniters (with either nozzle assemblies 500 or 800) described herein instead of shielded igniter 10.

In all the embodiments herein the timing of the pilot injection event and the main injection event are application specific. In an exemplary embodiment, the pilot injection event and the main injection event occur later in the combustion stroke. For example, the pilot injection event can begin between 90 and 160 crank angle degrees before TDC, and the main injection begin between 110 and 180 crank angle degrees before TDC. However, other timing strategies are contemplated, and pilot and/or main injections can occur during the intake stroke, during any part of the compression stroke, and even during the power stroke. There can be more than one pilot injection event and more than one main injection event. In some embodiments, a main injection event can occur before a pilot injection event such that the main injection event creates a premixed charge in the combustion chamber and the pilot injection event is employed to create an ignitable-fuel air mixture that is more easily ignited than the premixed charge. Pilot injections are of small quantities of fuel compared to main injections, and pilot injections are accompanied by ignition by the positive-ignition source (100, 535).

While exemplary fuel injector embodiments are described for application of injecting gaseous fuels in particular, an additional benefit of the designs disclosed herein is that the fuel injectors (injection valve arrangements) are capable of conveying and independently injecting fuels in gaseous, liquid, and/or supercritical form; and when using liquid fuels, particularly liquid fuels with low boiling point. Any fuel difficult to auto ignite in a particular combustion environment of an internal combustion engine can be advantageously supplied to and injected from the injection valve arrangements disclosed herein including such fuels as methanol, ethanol, propanol, butanol and blends thereof where sufficient atomization upon injection occurs and more preferably vaporization occurs to allow good mixing with in-cylinder air. It is preferable that when liquid fuels are employed that the liquid fuel atomizes and vaporizes prior to impacting shielded igniter 10 and retainers 630 and 830 of nozzle assemblies 500 and 800, respectively.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

The invention claimed is:

1. An apparatus for injecting and igniting fuel in an internal combustion engine, comprising:
a nozzle including a bore and a tip at a distal end, the bore includes a bore longitudinal axis and an annular valve seat;
a needle reciprocatable within the bore;
an injection valve between the needle and the annular valve seat, the injection valve in a closed position when the needle abuts the annular valve seat and in an open position when the needle is spaced apart from the annular valve seat;
a plenum in the nozzle downstream from the injection valve;
a retainer axially protruded from the tip of the nozzle along the bore longitudinal axis thereof, an annular mixing space extending between the retainer and the tip of the nozzle;
an igniter secured to the nozzle and including a positive-ignition source forming an ignition zone within a portion of the annular mixing space;
the nozzle including at least one of:
a pilot hole in the nozzle extending between the plenum and outside of the nozzle with a pilot hole longitudinal axis intersecting the retainer; and a first main hole in the nozzle extending between the plenum and outside the nozzle with a first main hole longitudinal axis bypassing the retainer; such that when a pilot fuel jet emanates from the pilot hole, the pilot fuel jet is retained and redirected such that an ignitable fuel-air mixture is formed within the annular mixing space; and
a second main hole in the nozzle extending between the plenum and outside the nozzle with a second main hole longitudinal axis bypassing the retainer such that when a main fuel jet emanates from the second main hole, the main fuel jet is scraped by the retainer and scraped fuel is retained and redirected such that an ignitable fuel-air mixture is formed within the annular mixing space;
wherein the igniter is actuated to ignite the ignitable fuel-air mixture.

2. The apparatus for injecting and igniting fuel as claimed in claim 1, wherein the pilot hole has a pilot hole injection angle between 0 degrees and 45 degrees between the bore longitudinal axis and the pilot hole longitudinal axis; and the first main hole has a first main hole injection angle between 50 degrees and 85 degrees between the bore longitudinal axis and the first main hole longitudinal axis.

3. The apparatus for injecting and igniting fuel as claimed in claim 2, further comprising a plurality of first main holes each having a main hole longitudinal axis respectively and the plurality of first main holes each is disposed such that the first main hole injection angle between the bore longitudinal axis and the first main hole longitudinal axis is between 50 degrees and 85 degrees.

4. The apparatus for injecting and igniting fuel as claimed in claim 1, wherein the second main hole has a second main hole injection angle between 15 degrees and 75 degrees between the bore longitudinal axis and the second main hole longitudinal axis.

5. The apparatus for injecting and igniting fuel as claimed in claim 4, further comprising a plurality of second main holes each having a second main hole longitudinal axis respectively and the plurality of second main holes each is disposed such that the second main hole injection angle between bore longitudinal axis and second main hole longitudinal axis is within a range of 15 degrees to 75 degrees.

6. The apparatus for injecting and igniting fuel as claimed in claim 1, wherein at least 0.1% of the fuel in the main fuel jet is scraped by the retainer and mixed within the annular mixing space.

7. The apparatus for injecting and igniting fuel as claimed in claim 1, wherein between 0.1% and 10% of the fuel in the main fuel jet is scraped by the retainer and mixed within the annular mixing space.

8. The apparatus for injecting and igniting fuel as claimed in claim 1, wherein an upper annular retaining surface of the retainer is sloped inwardly having a slope angle of 45 degrees to 90 degrees relative to the bore longitudinal axis 600 of the nozzle for retaining the ignitable fuel-air mixture within the annular mixing space.

9. The apparatus for injecting and igniting fuel as claimed in claim 1, wherein an upper annular retaining surface of the retainer is arced shaped forming a bowl for retaining the ignitable fuel-air mixture within the annular mixing space.

10. The apparatus for injecting and igniting fuel as claimed in claim 2, wherein cross-sectional flow area of the pilot hole is between a range of 5% to 15% of a cross-sectional flow area of the main hole.

11. The apparatus for injecting and igniting fuel as claimed in claim 2, wherein an upper annular retaining surface of the retainer has a slope angle near to and including 90 degrees, relative to the bore longitudinal axis of the nozzle, when the pilot hole injection angle is near to or at 0 degrees.

12. The apparatus for injecting and igniting fuel as claimed in claim 2, wherein an upper annular retaining surface of the retainer is arced shaped where a tangent to a portion of the arced shaped annular retaining surface that intersects the pilot hole longitudinal axis is orthogonal to the pilot hole longitudinal axis.

13. The apparatus for injecting and igniting fuel as claimed in claim 2, wherein a portion of fuel that flows through the pilot hole expands and impacts an annular retaining surface such that fuel flow redirects from a substantially vertical direction to a radial and circumferential directions relative to the bore longitudinal axis within the mixing space.

14. The apparatus for injecting and igniting fuel as claimed in claim 1, further comprising a post member connecting the retainer to the tip.

15. The apparatus for injecting and igniting fuel as claimed in claim 14, wherein the post member connecting the retainer to the tip is axisymmetric with the bore longitudinal axis.

16. The apparatus for injecting and igniting fuel as claimed in claim 14, wherein the nozzle, the post member, and the retainer are an integrated component.

17. The apparatus for injecting and igniting fuel as claimed in claim 16, wherein the pilot hole is formed by drilling or boring through the retainer.

18. The apparatus for injecting and igniting fuel as claimed in claim 1, wherein the positive-ignition source includes a heated surface.

19. The apparatus for injecting and igniting fuel as claimed in claim 1, wherein the positive-ignition source includes an electrode forming a spark gap between the igniter and the retainer; and/or between the igniter and the nozzle.

20. The apparatus for injecting and igniting fuel as claimed in claim 1, wherein the igniter is an elongate member with the positive-ignition source at a first distal end and an electrode at a second distal end, the electrode of the igniter electrically connected to an electrical conductor in the nozzle whereby an ignition signal is delivered to the positive-ignition source through the electrical conductor.

21. The apparatus for injecting and igniting fuel as claimed in claim 20, further comprising a slot formed in a lower portion of the nozzle supporting the igniter.

22. The apparatus for injecting and igniting fuel as claimed in claim 20, further comprising threads near the second distal end of the igniter which are received by corresponding threads in a second bore formed in an upper portion of the nozzle thereby securing the igniter to the nozzle.

23. The apparatus for injecting and igniting fuel as claimed in claim 20, wherein the igniter includes an insulated portion between the positive-ignition source at the first distal end and the electrode at the second distal end.

24. The apparatus for injecting and igniting fuel as claimed in claim 23, wherein a lower portion of the nozzle and the igniter including at least a part of the insulated portion of the igniter extends into a combustion chamber of the engine when the apparatus is installed in the engine.

25. The apparatus for injecting and igniting fuel as claimed in claim 1, wherein an upper portion of the nozzle is substantially located within a bore in a cylinder head of the engine when said apparatus is installed in the engine.

26. The apparatus for injecting and igniting fuel as claimed in claim 1, wherein a combustion seal is formed around an outer annular surface of the nozzle and a wall of a bore of a cylinder head of the engine when said apparatus is installed in the engine.

27. The apparatus for injecting and igniting fuel as claimed in claim 1, wherein the injection valve is actuated to an open position to inject fuel in a pilot injection event between 90 and 160 crank angle degrees before top dead center during a compression stroke.

28. The apparatus for injecting and igniting fuel as claimed in claim 1, wherein the injection valve is actuated to an open position to inject fuel in a main injection event between 110 and 180 crank angle degrees before top dead center during a compression stroke.

29. The apparatus for injecting and igniting fuel as claimed in claim 1, wherein the injection valve is actuated to inject fuel at an injection pressure above 200 bar.

30. The apparatus for injecting and igniting fuel as claimed in claim 1, wherein the injection valve is actuated to inject fuel at an injection pressure between 200-800 bar.

31. The apparatus for injecting and igniting fuel as claimed in claim 1, wherein the fuel has an autoignition temperature above 350 degrees Celsius.

32. The apparatus for injecting and igniting fuel as claimed in claim 1, wherein the fuel is a gaseous fuel.

33. The apparatus for injecting and igniting fuel as claimed in claim 1, wherein the fuel is hydrogen, methane, propane, natural gas, ammonia, or mixtures thereof.

34. The apparatus for injecting and igniting fuel as claimed in claim 1, wherein the fuel is methanol, ethanol, propanol, butanol or blends thereof.

* * * * *

UNITED STATES PATENT AND TRADEMARK OFFICE
CERTIFICATE OF CORRECTION

PATENT NO. : 12,123,375 B2
APPLICATION NO. : 18/565909
DATED : October 22, 2024
INVENTOR(S) : Jian Huang Page 1 of 1

It is certified that error appears in the above-identified patent and that said Letters Patent is hereby corrected as shown below:

In the Claims

<u>Column 14, Claim 19, Line 66:</u>
"retainer; and/or between" should read: --retainer; or between--.

Signed and Sealed this
Fourth Day of February, 2025

Coke Morgan Stewart
*Acting Director of the United States Patent and Trademark Office*